(No Model.)
A. BOLZANI.
SHAFT COUPLING.
No. 527,655.  Patented Oct. 16, 1894.
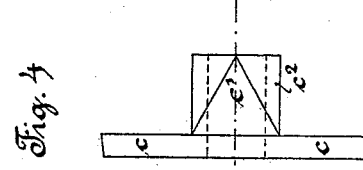
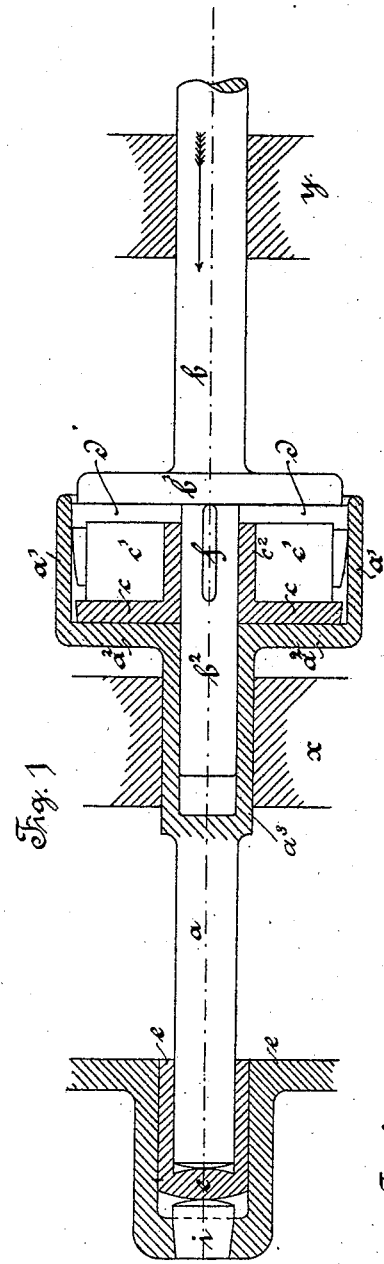
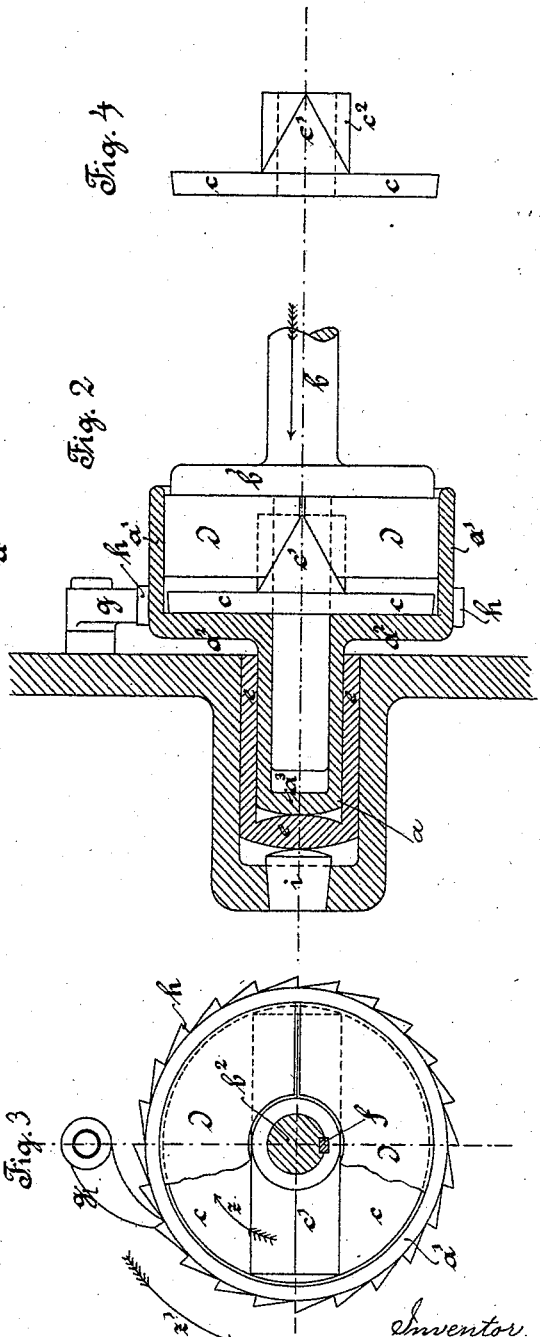
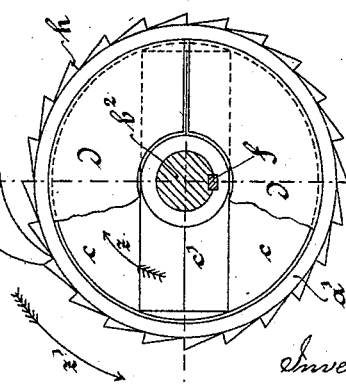
Witnesses:
Bert Pryor
John O'Connor
Inventor
Anton Bolzani
by Herbert W. T. Jenner
Attorney

UNITED STATES PATENT OFFICE.

ANTON BOLZANI, OF BERLIN, GERMANY.

SHAFT-COUPLING.

SPECIFICATION forming part of Letters Patent No. 527,655, dated October 16, 1894.

Application filed June 1, 1894. Serial No. 513,154. (No model.) Patented in Germany September 10, 1893, No. 75,977, and in England October 23, 1893, No. 19,946.

*To all whom it may concern:*

Be it known that I, ANTON BOLZANI, a subject of the King of Prussia and German Emperor, residing at Berlin, Prussia, Germany, have invented certain new and useful Improvements in Shaft-Couplings, also applicable for a brake, (for which I have obtained patents in Germany, No. 75,977, dated September 10, 1893, and in Great Britain, No. 19,946, dated October 23, 1893;) and I do hereby declare the following to be a full, clear, and exact description of the invention, such as will enable others skilled in the art to which it appertains to make and use the same.

This invention has for its object a frictional coupling which serves for connecting two shafts whether they are in a vertical or any other position, and which renders it possible for the shafts to be connected without a shock even while they are rotating; at the same time bringing both shafts in a line with each other. The possibility is also afforded of allowing the two shafts to run at different speeds without disengaging the coupling, according to the degree of axial pressure which exists between the two shafts. In one form of construction, the coupling may, however, also be employed as a brake for blocks and pulleys to prevent backward travel of the carrying shaft which is exposed to axial pressure.

On the accompanying drawings, Figure 1 shows a form of construction as a shaft coupling; and Figs. 2 and 3 represent the arrangement as a brake for lifting apparatus. Fig. 4 shows a disk which will be hereinafter more particularly explained.

A hollow cylindrical extension $a'$ $a^2$ is firmly connected to or forms a part with the shaft $a$, Fig. 1, while the shaft $b$ carries a fixed disk $b'$ also a disk $c'$ and sleeve $c^2$ prevented from revolving by means of the spline $f$ but capable of adjustment. The part $b^2$ of the shaft $b$ which extends beyond $b'$ is inserted in a sleeve $a^3$ forming part of the shaft $a$ and the latter at its other end rests in a bush $e$ on convex surfaces, which bush may also run in a fixed bearing on convex surfaces. Ordinarily, slipping takes place between the shaft $a$ and box $e$, and only when these bearings become abraded and stuck together does slipping between $e$ and $i$ take place.

$x$ and $y$ are bearings for the shaft.

The disk $c$ which is adjustable on the shaft $b^2$ has two wedge shaped projections $c'$, which serve to press the two semi-cylindrical friction cheeks $d$ against the wall of the hollow cylinder $a'$ after the disk $c$ has come to bear against the surface $a^2$ in case of axial pressure being exerted on these friction cheeks by means of the disk $b'$. Friction thus results between the disks $c$ and $a^2$ as well as between the semi-cylindrical cheeks $d$ and hollow cylinder $a'$.

The friction will of course vary in amount according to the degree of the strain on the shaft either through its own weight or from other causes. The friction may be further increased by inserting between $c$ and $a^2$ a substance such as leather. This insertion would also serve for entirely preventing any shock when the coupling takes place.

Figs. 2 and 3 show how this coupling may also be used as a brake for a lifting apparatus and in this case the shaft $a$ is much shorter and consists merely of the sleeve $a^3$ having convex bearing surfaces at one end similar to the bearings in Fig. 1. The hollow cylindrical part $a'$ has teeth $h$ on its periphery in combination with a pawl $g$ attached to the case of the block and pulley, only permitting the part $a'$ to revolve in the direction of the arrow $z'$ while, when the rotation is in the direction of the arrow $z^2$, the friction which results between the friction surfaces of the coupling must be overcome. When the shaft $b$ is revolved in the direction of the arrow in Fig. 3, the shaft $a$ is also revolved, and may be used to revolve a winding or hoisting mechanism. The pawl $g$ and the ratchet wheel $h$ serve to sustain the load when the shaft $b$ is released. When the pawl is turned over out of gear with the ratchet wheel, the load will descend with more or less rapidity if the shaft $b$ be held stationary and pressed in the direction of the arrow in Fig. 1 with more or less pressure.

What I claim is—

1. The combination, with the shaft $a$ provided with a sleeve $a^3$ and a cylindrical chamber $a'$; of a shaft $b$ provided with a part $b^2$ journaled in the said sleeve, and a disk $d$; a disk $c$ splined on the part $b^2$ inside the said chamber and provided with the wedge-shaped projections $c'$; and the semi-cylindrical cheeks $d$ interposed between the projections $c'$ and the disk $b'$ inside the said chamber, substantially as and for the purpose set forth.

2. The combination, with the shaft $a$ provided with a sleeve $a^3$ and a cylindrical chamber $a'$ having ratchet-wheel teeth $h$ upon its outer periphery; of a shaft $b$ provided with a part $b^2$ journaled in the said sleeve, and a disk $d$; a disk $c$ splined on the part $b^2$ inside the said chamber and provided with the wedge-shaped projections $c'$; the semi-cylindrical cheeks $d$ interposed between the projections $c'$ and the disk $b'$ inside the said chamber; and the stationary pivoted pawl $g$ engaging the teeth $h$ and normally preventing the shaft $a$ from revolving backward, substantially as and for the purpose set forth.

In testimony whereof I have affixed my signature in presence of two witnesses.

ANTON BOLZANI.

Witnesses:
REINHARD WAGNITZ,
OSCAR SCHMIDT.